US010173768B2

United States Patent
Goelling et al.

(10) Patent No.: US 10,173,768 B2
(45) Date of Patent: Jan. 8, 2019

(54) HIGH-LIFT FLAP, ARRANGEMENT OF A HIGH-LIFT FLAP TOGETHER WITH A DEVICE FOR INFLUENCING THE FLOW ON THE SAME AND AIRCRAFT COMPRISING SAID ARRANGEMENT

(75) Inventors: Burkhard Goelling, Stuhr (DE); Heinz Hansen, Weyhe (DE); Rolf Radespiel, Braunschweig (DE); Christoph Jensch, Braunschweig (DE); Kai-Christoph Pfingsten, Barsinghausen (DE); Klaus-Peter Neitzke, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 1072 days.

(21) Appl. No.: 13/146,296

(22) PCT Filed: Jan. 26, 2010

(86) PCT No.: PCT/EP2010/000447
§ 371 (c)(1),
(2), (4) Date: Nov. 10, 2011

(87) PCT Pub. No.: WO2010/084025
PCT Pub. Date: Jul. 29, 2010

(65) Prior Publication Data
US 2012/0043428 A1  Feb. 23, 2012

Related U.S. Application Data

(60) Provisional application No. 61/147,196, filed on Jan. 26, 2009.

(30) Foreign Application Priority Data

Jan. 26, 2009 (DE) .................. 10 2009 006 145

(51) Int. Cl.
*B64C 21/04* (2006.01)
*B64C 21/02* (2006.01)
(Continued)

(52) U.S. Cl.
CPC .............. *B64C 21/025* (2013.01); *B64C 9/18* (2013.01); *B64C 21/08* (2013.01);
(Continued)

(58) Field of Classification Search
CPC ..... Y02T 50/32; Y02T 50/166; Y02T 50/145; B64C 2230/04; B64C 21/025; B64C 21/00; B64C 9/14; B64C 21/02; B64C 2230/16
(Continued)

(56) References Cited

U.S. PATENT DOCUMENTS 2,427,972 A    9/1947  Melchior
3,949,956 A *  4/1976  Alvarez-Calderon .... B64C 9/28
                                                  244/211
(Continued)

FOREIGN PATENT DOCUMENTS

CN   101 052 565 A    10/2007
CN   101052565 A      10/2007
(Continued)

OTHER PUBLICATIONS

International Search Report for Application Serial No. PCT/EP2010/000447 dated Jul. 6, 2010.
(Continued)

*Primary Examiner* — Tien Q Dinh
*Assistant Examiner* — George Andonyan
(74) *Attorney, Agent, or Firm* — Jenkins, Wilson, Taylor & Hunt, P.A.

(57) ABSTRACT

An aerodynamic body of an aircraft with an air outlet opening and an air intake opening that communicates with
(Continued)

the air outlet opening via an air conduit is described. A flow delivery driver device for influencing the flow within the air conduit is integrated into the air conduit. The surfaces of the aerodynamic body in the body chord direction include at least one air outlet opening in the front region of the aerodynamic body, and at least one air intake opening on the upper surface of the aerodynamic body and in the rear region of the aerodynamic body and/or on the upper surface of the aerodynamic body in the trailing edge region and/or on the lower surface of the aerodynamic body in the trailing edge region. Arrangements of a main wing and an adjustable flap, and an aircraft with such an aerodynamic body are also described.

1 Claim, 7 Drawing Sheets

(51) Int. Cl.
*B64C 9/18* (2006.01)
*B64C 21/08* (2006.01)
(52) U.S. Cl.
CPC ...... *B64C 2230/04* (2013.01); *B64C 2230/06* (2013.01); *Y02T 50/166* (2013.01)
(58) Field of Classification Search
USPC ............ 244/198, 204, 204.1, 207, 208, 209, 244/210–217
See application file for complete search history.

(56) References Cited

U.S. PATENT DOCUMENTS

| | | | |
|---|---|---|---|
| 5,335,885 A | 8/1994 | Bohning | |
| 5,366,177 A | 11/1994 | Decoux | |
| 5,687,934 A * | 11/1997 | Owens | 244/208 |
| 5,772,165 A | 6/1998 | Schroeder | |
| 7,708,229 B1 * | 5/2010 | Angle et al. | 244/206 |
| 2002/0179777 A1 * | 12/2002 | Al-Garni et al. | 244/206 |
| 2003/0150962 A1 * | 8/2003 | Orban | B64C 21/025 244/209 |
| 2006/0102801 A1 | 5/2006 | Manley | |
| 2007/0034746 A1 * | 2/2007 | Shmilovich | B64C 9/16 244/207 |
| 2007/0051855 A1 * | 3/2007 | Shmilovich | B64C 9/16 244/207 |
| 2009/0173834 A1 * | 7/2009 | Prince | B64C 23/06 244/198 |
| 2009/0212165 A1 * | 8/2009 | Parikh | B64C 21/06 244/209 |
| 2009/0321580 A1 * | 12/2009 | Boldrin et al. | 244/208 |
| 2010/0127129 A1 * | 5/2010 | Zha et al. | 244/208 |
| 2010/0303634 A1 * | 12/2010 | Long | 416/90 A |
| 2011/0210211 A1 * | 9/2011 | Zha et al. | 244/208 |

FOREIGN PATENT DOCUMENTS

| | | |
|---|---|---|
| CN | 102 438 897 A | 5/2012 |
| DE | 584 585 A | 9/1933 |
| DE | 11 47 850 | 4/1963 |
| DE | 11 65 419 B | 3/1964 |
| DE | 10 2006 028 167 A | 12/2007 |
| EP | 0 558 904 A | 9/1993 |
| EP | 1 873 395 A | 1/2008 |
| WO | WO 2007/072259 A | 6/2007 |

OTHER PUBLICATIONS

Written Opinion of the International Searching Authority for Application Serial No. PCT/EP2010/000447 dated Jan. 17, 2012.
Chinese Search Report for Application No. 2010/800055945 dated Nov. 27, 2013.
First Chinese Office Action for Application No. 2010/80005594.5 dated Dec. 9, 2013.
Second Chinese Office Action for Application No. 2010 80005594.5 dated Sep. 4, 2014.
Third Chinese Office Action for Application No. 2010 80005594.5 dated Mar. 17, 2015.

* cited by examiner

US 10,173,768 B2

HIGH-LIFT FLAP, ARRANGEMENT OF A HIGH-LIFT FLAP TOGETHER WITH A DEVICE FOR INFLUENCING THE FLOW ON THE SAME AND AIRCRAFT COMPRISING SAID ARRANGEMENT

RELATED APPLICATIONS

The present application is a national stage entry according to 35 U.S.C. § 371 of PCT application No.: PCT/EP2010/000447 filed on 26 Jan. 2010, which claims priority from German Application No.: 10 2009 006 145.2, filed on 26 Jan. 2009, and from U.S. Provisional Application No. 61/147,196, filed on 26 Jan. 2009.

TECHNICAL FIELD

The invention pertains to a high-lift flap, to an arrangement of a high-lift flap with a device for influencing the flow thereon and to an aircraft with such an arrangement.

BACKGROUND

DE 10 2006 028 167 A1 describes a method for operating a system that features at least one fluid-dynamic lift body and, e.g., a wind power plant with rotor blades, an aircraft with airfoils or a helicopter with rotor blades. In this case, suitable sensors acquire parameters that are characteristic of the occurrence of turbulences of the medium surrounding a lift body which are caused by said lift body, particularly noises caused by the lift body, and/or of the occurrence of flow separations on the lift body and/or of icing of the lift body. Depending on the acquired parameters, a fluid that originates from a pressure source such as, e.g., air is routed outward to the medium surrounding the lift body from a plurality of fluid outlet openings assigned to one or each lift body, namely such that turbulences caused by the lift body and/or flow separations and/or icing are reduced or prevented due to the resulting fluid flows.

U.S. Pat. No. 5,772,165 B1 and U.S. Pat. No. 5,366,177 A describe a wing, on the upper side of which several suction openings are embedded in order to divert part of the air flowing around the upper side of the wing and to thusly stabilize the boundary layer along this upper side.

DE 1 147 850 describes a wing with a spoiler arranged in front thereof, wherein a fluid is ejected forward underneath the spoiler or from the front edge of the spoiler in the form of a flat jet such that it travels rearward over the upper surface of the spoiler due to the forward motion of the aircraft in order to generate high lift at small angles of attack due to the formation of turbulences.

SUMMARY

Various embodiments of the invention make available a high-lift flap, as well as an arrangement of a high-flap with a device for influencing the flow, by means of which an optimal stabilization of the boundary layer flow on a wing and, in particular, a high-lift flap can be achieved.

According to the invention, an aerodynamic body of an aircraft is proposed that, in particular, has a first surface and a second surface that respectively extend along the flap chord direction and around which a flow normally flows in a flow direction, wherein the first surface on the adjustable flap normally is an upper surface extending along a suction side and the second side is a lower surface extending along a pressure side of the adjustable flap, wherein at least one air outlet opening and at least one air intake opening that communicates with the air outlet opening via at least one air conduit are arranged on the adjustable flap, wherein a flow delivery driver device for influencing the flow within the air conduit is integrated into the air conduit, and wherein the following openings are provided on the surfaces of the adjustable flap in the flap chord direction:
  at least one air outlet opening that is arranged in the front region of the adjustable flap referred to the flow direction which extends up to 15% of the flap chord, and
  at least one air intake opening that is arranged on the upper surface of the adjustable flap and in the rear region of the adjustable flap referred to the flow direction which extends between 30% and 90% of the flap chord and/or on the upper surface of the adjustable flap in the trailing edge region extending from 90% to 100% of the flap chord and/or on the lower surface of the adjustable flap in the trailing edge region of the adjustable flap which extends from 90% to 100% of the flap chord.

In this case, the at least one air outlet opening and the at least one air outlet opening may be situated within a section that has a width of 80% of the flap chord in the wingspan direction of the adjustable flap, wherein the flap chord exists on one of the air outlet openings or the air outlet opening. The adjustable flap may generally feature exactly one air outlet opening that is situated on the upper surface of the adjustable flap and in the front region extending from 0% to 15% of the flap chord.

According to another exemplary embodiment, the adjustable flap may feature a first front air outlet opening and at least one second rear air outlet opening, wherein the second rear air outlet opening is situated behind the first front air outlet opening referred to the flow direction and in the front region of the adjustable flap which extends from 3% to 15% of the flap chord. In this case, the first front air outlet opening may be situated in the front region of the adjustable flap which extends from 0% to 3% of the flap chord and on the foremost end or the upper surface of the adjustable flap. Alternatively, the first front air outlet opening may also be situated in the front region of the adjustable flap which extends from 0% to 3% of the flap chord and on the foremost end or the lower surface of the adjustable flap.

An air outlet opening may be situated in a front region of the adjustable flap that, in a position of the adjustable flap of 60 degrees+/−8 degrees or in the fully extended position of the adjustable flap, is situated underneath the trailing upper edge of the main wing referred to the wing thickness direction of the main wing and extends from the location that is situated exactly underneath the trailing upper edge of the main wing in two opposite directions of the flow direction by 3% of the flap chord.

The adjustable flap may have a contour line in its front region referred to the flap chord which continuously changes from a curvature radius amounting to 3% of the profile chord of the adjustable flap to a curvature radius amounting to 12% of the profile chord of the adjustable flap in the flow direction along the upper surface or in the flap chord direction, wherein the profile chord is respectively decisive at the location referred to the wingspan direction of the adjustable flap, at which at least one of the two air outlet openings is situated.

Outlet openings of the adjustable flap may, referred to the flap chord, also be situated in a region of the contour line, in which the curvature radius of the contour line of the front region of the adjustable flap continuously changes from a curvature radius amounting to 3% of the profile chord of the adjustable flap to a curvature radius amounting to 12% of the profile chord of the adjustable flap in the flow direction along the upper surface or in the flap chord direction, wherein the profile chord is respectively decisive at the location referred to the wingspan direction of the adjustable flap, at which at least one of the two air outlet openings is situated.

Several air outlet openings may generally be arranged adjacent to one another in the wingspan direction and in the region extending up to 15% of the flap chord. Several air intake openings may also be arranged adjacent to one another in the wingspan direction.

The aerodynamic body according to the invention may consist of a main wing of an aircraft or of a adjustable flap that can be adjusted relative to a structural component of an aircraft. In this case, the structural component may consist of a main wing and the adjustable flap may consist of a high-lift flap. The structural component may also consist of a fuselage component and the adjustable flap may consist of a canard.

The invention also proposes a rudder of an aircraft with a first surface and a second surface that respectively extend along the flap chord direction and around which a flow normally flows in a flow direction, wherein at least one air outlet opening and at least one air intake opening that communicates with the air outlet opening via at least one air conduit are arranged on the rudder on each of the oppositely situated surfaces, wherein a flow delivery driver device for influencing the flow within the air conduit is integrated into the air conduit, and wherein the following openings are provided on the surfaces of the rudder in the flap chord direction:
- at least one air outlet opening that is arranged in the front region of the rudder (K) referred to the flow direction which extends up to 15% of the flap chord, and
- at least one air intake opening (23) that is arranged in the rear region referred to the flow direction which extends between 30% and 90% of the flap chord and/or in the trailing edge region of the rudder which extends from 90% to 100% of the flap chord.

According to another exemplary embodiment of the invention, an arrangement of a adjustable flap with a device for influencing the flow thereon is proposed, wherein the adjustable flap is realized with a flow delivery driver device according to the preceding claims, and wherein the device for influencing the flow features:
- an activation device that is functionally connected to the adjustable flap adjusting device and serves for controlling the flow delivery driver device, wherein the activation device receives an input quantity in the form of the state of adjustment of the adjustable flap from the adjustable flap adjusting device and has
- an activation function that is functionally connected to the flow delivery driver device and serves for generating a command signal for controlling the throughput of the flow delivery driver device, wherein said activation function generates a corresponding control signal for the activation of the flow delivery driver device from the state of adjustment of the adjustable flap.

In this case, the adjustable flap may be realized, in particular, in accordance with an exemplary embodiment of the invention.

According to another exemplary embodiment of the invention, an arrangement of a adjustable flap with a device for influencing the flow thereon is proposed, wherein the device for influencing the flow features:
- one respective device for varying an opening on at least one outlet opening on the adjustable flap and/or on at least one intake opening of the adjustable flap in order to open and close the at least one outlet opening and/or the at least one intake opening by means of a mechanism for varying an opening and an actuator that serves for actuating the respective mechanism for varying an opening and is coupled thereto,
- wherein the activation device for controlling the actuator of the respective device for varying an opening is functionally connected to the adjustable flap adjusting device and receives an input quantity in the form of the state of adjustment of the adjustable flap from this adjustable flap adjusting device, wherein the activation device has an activation function that is functionally connected to the respective actuator and serves for generating a command signal for controlling the actuator, and wherein said activation function generates a corresponding signal for opening and closing the at least one outlet opening and/or the at least one outlet opening from the state of adjustment of the adjustable flap and transmits this signal to the actuator.

In this case, the device for influencing the flow may, in particular, feature:
- a flow delivery driver device for influencing the flow within the air conduit that is connected to at least one outlet opening on the adjustable flap and to at least one intake opening on the adjustable flap,
- a sensor device with at least one sensor that is arranged on the upper surface of the adjustable flap and serves for acquiring current flow values on the upper surface of the adjustable flap;
- a control device with a regulating function that serves for regulating a predetermined flow value of the adjustable flap and is functionally connected to: the sensor device in order to receive current flow values, the adjustable flap adjusting device in order to receive a value for the state of adjustment of the adjustable flap and the flow delivery driver device in order to generate a control signal for controlling the throughput of the flow delivery device.

The sensor device provided in the exemplary embodiments of the invention may feature a sensor for acquiring the state of the flow on or separated from the upper surface of the adjustable flap. The sensor may consist of a sensor for acquiring the flow speed. In this case, the sensor may consist of a piezoelectric wall shear stress sensor for acquiring the wall shear stress. The control device may be arranged in the adjustable flap.

According to another exemplary embodiment of the invention, an arrangement of a adjustable flap with a device for influencing the flow thereon is proposed, wherein the adjustable flap is realized in accordance with an exemplary embodiment of the invention, and wherein the device for influencing the flow features:
- one respective device for varying an opening on at least one outlet opening on the adjustable flap and/or on at least one intake opening of the adjustable flap in order to open and close the at least one outlet opening and/or the at least one intake opening by means of a mechanism for varying an opening and an actuator that serves for actuating the respective mechanism for varying an opening and is coupled thereto,
- a sensor device with at least one sensor that is arranged on the upper surface of the adjustable flap and serves for acquiring current flow values on the upper surface of the adjustable flap;

a control device with a regulating function that serves for regulating a predetermined flow value of the adjustable flap and is functionally connected to: the sensor device in order to receive current flow values from the sensor device, the adjustable flap adjusting device in order to receive a value for the state of adjustment of the adjustable flap from the adjustable flap adjusting device and the at least one actuator in order to generate a command signal by means of the control device and to transmit the command signal to the actuator so as to adjust the opening and closing position of the respective device for varying an opening.

According to another exemplary embodiment of the invention, an arrangement of a main wing and an arrangement of a adjustable flap with a device for influencing the flow thereon are proposed, wherein the arrangement of a adjustable flap with a device for influencing the flow thereon is realized in accordance with an exemplary embodiment of the invention, and wherein the main wing features a channel that extends from an intake opening arranged on the pressure side of the main wing to an air outlet opening arranged on a rear surface of the main wing that faces the adjustable flap such that the air flow discharged between the outlet opening and the air outlet opening influences the flow in the gap between the main wing and the adjustable flap.

In this case, a flow delivery driver device that is activated by the activation device may be installed in the channel arranged in the main wing, wherein this flow delivery driver device makes it possible to influence the flow in the channel and in the gap between the main wing and the adjustable flap and is activated by the activation device, and/or a device for varying an opening that is activated by the activation device may be arranged on the outlet opening of the main wing in order to open and close the outlet opening and to thusly influence the flow in the channel and in the gap between the main wing and the adjustable flap.

According to another exemplary embodiment of the invention, an aircraft with an aerodynamic body and a adjustable flap that can be moved thereon and with a control device that has a flap activation function for adjusting the adjustable flaps is proposed, wherein the adjustable flaps respectively have a first surface and a second surface that respectively extend along the flap chord direction and around which a flow normally flows in a flow direction, wherein the first surface of the adjustable flap normally is an upper surface extending along a suction side and the second side is a lower surface extending along a pressure side of the adjustable flap, wherein at least one air outlet opening and at least one air intake opening that communicates with the air outlet opening via at least one air conduit are respectively arranged on the adjustable flaps, wherein a flow delivery driver device for influencing the flow within the air conduit is integrated into the air conduit, and wherein the control device generates activation commands for adjusting the state of adjustment of the adjustable flaps and activation commands for adjusting the throughput of the flow delivery driver device due to control commands and respectively transmits these activation commands to the adjustable flaps and to the flow delivery driver device.

In this exemplary embodiment, the adjustable flap may feature a first front air outlet opening and at least one second rear air outlet opening, wherein the second rear air outlet opening is situated behind the first front air outlet opening referred to the flow direction and in the front region of the adjustable flap which extends from 3% to 15% of the flap chord.

In these exemplary embodiments, a device for varying an opening may be arranged on the first outlet opening and on at least one second outlet opening of the adjustable flap in order to open and close the respective outlet opening, the activation device may be functionally connected to the devices for varying an opening in order to control the respective device for varying an opening and to receive an input quantity in the form of the state of adjustment of the adjustable flap from this device for varying an opening, wherein the activation device has an activation function that is functionally connected to the respective actuator in order to generate a command signal for controlling the actuator, and wherein said activation function generates a corresponding signal for opening and closing the at least one outlet opening and/or the at least one outlet opening from the state of adjustment of the adjustable flap and transmits this signal to the actuator.

In order to adjust a state of adjustment of the adjustable flaps, the control device may be realized in such a way that it adjusts the throughput of the flow delivery driver device and the state of the devices for varying an opening assigned to the air outlet openings due to control commands while commanding states of adjustment of adjustable flaps, wherein the first front air outlet opening is in a closed state due to the activation of the device for varying an opening assigned thereto while commanding a first range of adjustment of adjustable flaps, and wherein the first front air outlet opening is in an open state due to the activation of the device for varying an opening assigned thereto while commanding a second range of adjustment of adjustable flaps.

In this case, the first front air outlet opening may be in an open state due to the activation of the device for varying an opening assigned thereto while commanding a second range of adjustment of adjustable flaps and the second air outlet opening may simultaneously be in a closed state at least in certain time segments due to the activation of the device for varying an opening assigned thereto. In this case, the adjustable flap also may be extended farther in the second range of adjustment than in the first range of adjustment of the adjustable flap.

In an embodiment of the inventive aircraft, the following openings may be provided on the surfaces of the adjustable flap in the flap chord direction:

at least one air outlet opening that is arranged in the front region of the adjustable flap referred to the flow direction which extends up to 15% of the flap chord, and at least one air intake opening that is arranged on the upper surface of the adjustable flap and in the rear region of the adjustable flap referred to the flow direction which extends between 30% and 90% of the flap chord and/or on the upper surface of the adjustable flap in the trailing edge region extending from 90% to 100% of the flap chord and/or on the lower surface of the adjustable flap in the trailing edge region of the adjustable flap which extends from 90% to 100% of the flap chord.

The control device with a flap activation function may feature an activation device for controlling the flow delivery driver device in order to adjust the adjustable flaps. The control device with a flap activation function may alternatively or additionally feature a control device for controlling the flow delivery driver device in order to adjust the adjustable flaps.

In the inventive embodiments, the gap formed between the main wing and the adjustable flap may, in particular, be realized such that it is not aerodynamically active.

The sensor device may feature one or more sensors for acquiring the state of the flow on or separated from the upper surface of the high-lift flap. In this case, the sensor or several sensors may consist of a hot-wire sensor in order to acquire the flow speed. The sensor or several sensors may furthermore consist of a piezoelectric wall shear stress sensor in order to acquire the wall shear stress. In this case, the sensor or several sensors for acquiring the wall shear stress may consist of a hot-film sensor.

The sensor or several sensors may generally consist of a sensor for acquiring the properties of the state of flow on the upper surface of the flap which is realized such that the state of flow can be definitively determined from the signal generated by the sensor, i.e., that it can be determined whether a laminar or separated flow exists.

The pump and/or the activation device may be respectively arranged in the high-lift flap.

BRIEF DESCRIPTION OF THE DRAWINGS

Exemplary embodiments of the invention are described below with reference to the attached figures, in which.

DESCRIPTION

Figure 1:
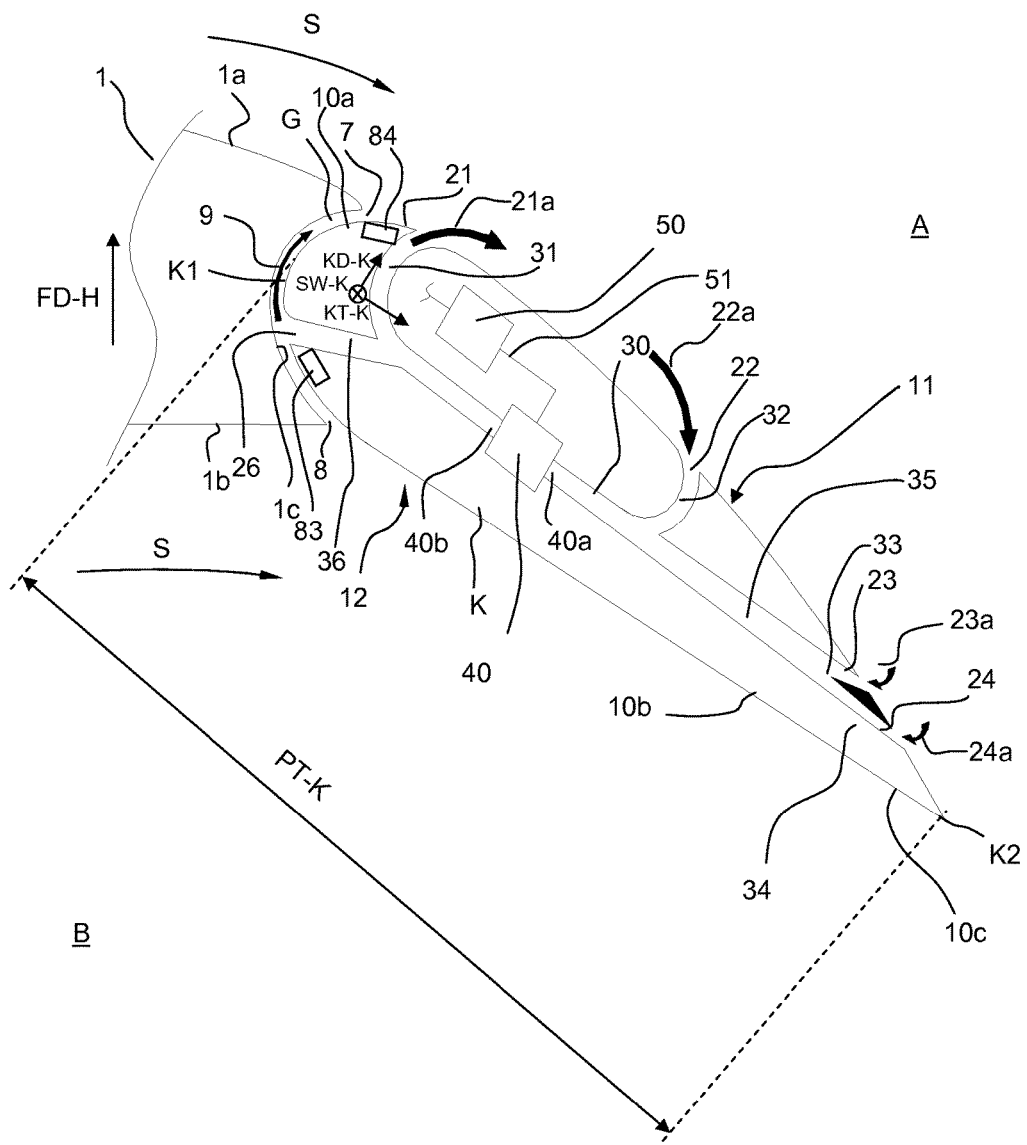
FIG. 1 shows a schematic representation of a first embodiment of an aerodynamic body according to the invention such as, e.g., a wing or a high-lift flap that features several intake openings, two outlet openings, air conduits connecting these intake openings and outlet openings, as well as a flow delivery driver device for influencing the flow within the air conduits, by means of which the air flow is formed in an active fashion on different.

The invention is described below with reference to a high-lift flap. However, the invention can generally be applied to an aerodynamic body of an aircraft that may consist of a wing, particularly a main wing, a slat or a leading edge flap, a rudder unit or a rudder, or a horizontal stabilizer or an elevator. The adjustable flap may be coupled to the main wing by means of an articulation arrangement. The articulation arrangement may feature, in particular, dropped-hinge-kinematics or track-kinematics.

Different exemplary embodiments of the invention are illustrated in the figures. The figures respectively show a high-lift flap 10 that is coupled to a main wing 1. According to the invention, the characteristics realized on a adjustable flap or a high-lift flap may generally also be realized on an aerodynamic body, to which the characteristics described herein with reference to a high-lift flap are directly or analogously transferred. The aerodynamic body according to the invention may, in particular, also consist of a main wing 1. The main wing 1 features an upper surface 1a extending on the suction side A thereof, a lower surface 1b extending on the pressure side B thereof and a rear surface 1c that faces the high-lift flap K. A flap chord direction KT-K or generally chord direction, a wingspan direction SW-K or generally wingspan direction and a flap thickness direction KD-K or generally flap thickness direction are defined for the high-lift flap or, in general, for the adjustable flap or the aerodynamic body. The adjustable flap or high-lift flap K features an upper surface 11 extending on the suction side A of the high-lift flap K and a lower surface 12 extending on the pressure side B of the high-lift flap K. According to the invention, at least one air outlet opening and/or at least one air intake opening is/are provided on the upper surface 11 of the high-lift flap K.

In the illustrations according to FIGS. 1 to 7, a gap G with a first upper end 7 that is situated between the suction side or the upper surface 1a of the main wing 1 and the suction side 11 of the high-lift flap K and a second lower end 8 that is situated between the pressure side or the lower surface 1b of the main wing 1 and the pressure side 12 of the high-lift flap K is present between the main wing 1 and the high-lift flap. In the presence of an aerodynamically active gap G between the main wing and the adjustable flap K and a normal flow around the main wing 1 and the high-lift flap K, air flows from the suction side B or the second end 8 of the gap G to the pressure side A or the first end 8 of the gap G (arrow 9).

According to the invention, however, this gap G does not have to be present. Exemplary embodiments of the invention may also pertain to a combination of a main wing and a adjustable flap, in which no aerodynamically active gap G is present between the main wing and the adjustable flap K.

Although a small gap or small clearance between the main wing and the adjustable flap K is realized in such a "gapless adjustable flap," the size of the gap G or the clearance is so small that the air situated therein has no aerodynamically active influence on the flow around the main wing and the adjustable flap. These exemplary embodiments may be realized, in particular, in connection with a so-called Coanda flap.

In the high-lift flaps illustrated in FIGS. 1 to 7, at least one air outlet opening 21, 26 is arranged in the front region 10a of the high-lift flap K referred to the flow direction S and a total of three air intake openings 22, 23, 24 are arranged in the rear region 10b of the high-lift flap K referred to the flow direction S. In the exemplary embodiments of the high-lift flap K illustrated in FIGS. 1, 3, 6 and 7, two air outlet openings 21, 26 are arranged in the front region 10a of the high-lift flap K which extends up to 15% of the flap chord KT. In the high-lift flaps illustrated in FIGS. 1 to 7, an air intake opening 24 is arranged in the trailing edge region 10c of the high-lift flap K. Alternatively, several air intake openings may be arranged in the front region 10a of the high-lift flap K and/or only one air outlet opening may be arranged in the rear region 10b of the high-lift flap K and/or several air outlet openings may be arranged in the trailing edge region 10c of the high-lift flap K. In the embodiments of the high-lift flap 10 illustrated in FIGS. 1, 2, 3, 7, 8 and 9, two outlet openings 21, 25 are arranged on the front region 10a of the high-lift flap K which extends up to 15% of the flap chord KT.

According to the invention, it is proposed
that the at least one air outlet opening is arranged in the front region 10a referred to the flow direction S which extends up to 15% of the flap chord KT, and/or
that at least one air intake opening 23 is arranged in the rear region 10b referred to the flow direction S which extends between 30% and 80% of the flap chord KT, and/or
that at least one air intake opening 24 is arranged on the upper surface and/or on the lower surface in the trailing edge region 10c of the high-lift flap K which is situated behind the rear region 10b referred to the flow direction S and extends from 90% to 100%.

In this context, the trailing edge region 10c of the high-lift flap K is the region of the high-lift flap K that is situated behind the rear region 10b referred to the flow direction S and on the end of the high-lift flap K.

According to the invention, only one intake opening 22, 23, 24 may also be arranged on the rear region 10b or on the trailing edge region 10c of the high-lift flap 10. In FIGS. 1 to 7, two intake openings 22, 23 are respectively arranged in the rear flap region 10b and one intake opening 24 is respectively arranged in the trailing edge region 10c. The intake openings 22, 23, 24 are respectively connected to channels 32, 33 and 34 that are situated in the interior of the high-lift flap and respectively lead into a junction channel 30. The junction channel 30 connects the respective channels 32, 33 and 34 to at least one outlet channel 31, 36 leading to the surface of the front region 10a of the high-lift flap 10. The respective channels 32, 33 and 34 connected to the intake openings 22, 23, 24 or the at least one channel connected to the at least one intake opening may also be directly connected to the at least one outlet opening 21, 26. In FIGS. 1 to 7, the intake flows created while the flow S flows around the main wing 1 and the high-lift flap are respectively indicated with the arrows 22a, 23a and 24a.

FIGS. 1, 3, 6 and 7 show embodiments of the inventive high-lift flap K with two outlet openings 21, 26, wherein the outlet flows created while the flow S flows around the main wing 1 and the high-lift flap are respectively indicated with the arrows 21a and 26a. Each outlet opening 21, 26 is connected to one respective outlet channel 21 and 36 that, in turn, may be connected to a central junction channel 30 and to the intake openings via this junction channel. In this case, the central junction channel 30 can be eliminated and a direct connection may be respectively realized between one or more outlet openings or at least one outlet channel and at least one intake opening or the respectively assigned intake channel. One outlet opening may also be respectively connected to one intake opening.

According to the invention, it is furthermore proposed that a flow delivery driver device 40, 41, 42, particularly in the form of a pump 40, is active in at least one of the channels of the adjustable flap or the aerodynamic body in order to drive the air situated in the channel or in several channels in a predetermined direction and to thusly adjust an air flow of predetermined type and intensity in at least one channel. For this purpose, the flow delivery driver device 40, 41, 42 is integrated or installed into the respective channel. The flow delivery driver device 40, 41, 42 may be installed or integrated into the central junction channel 30 and/or one of the at least one intake channels or one of the at least one respective outlet channels 32, 33 and 34. In this case, several flow delivery driver devices may also be integrated into one or more conduits of the aerodynamic body. The conduit, into which the flow delivery driver device or the pump, features an intake 40a and an outlet 40b. The flow delivery driver device may operate with a permanently adjusted power or be realized such that the intake pressure and/or the delivery pressure and/or the differential pressure is varied or controlled due to a corresponding actuation by an actuation function.

Figure 3:
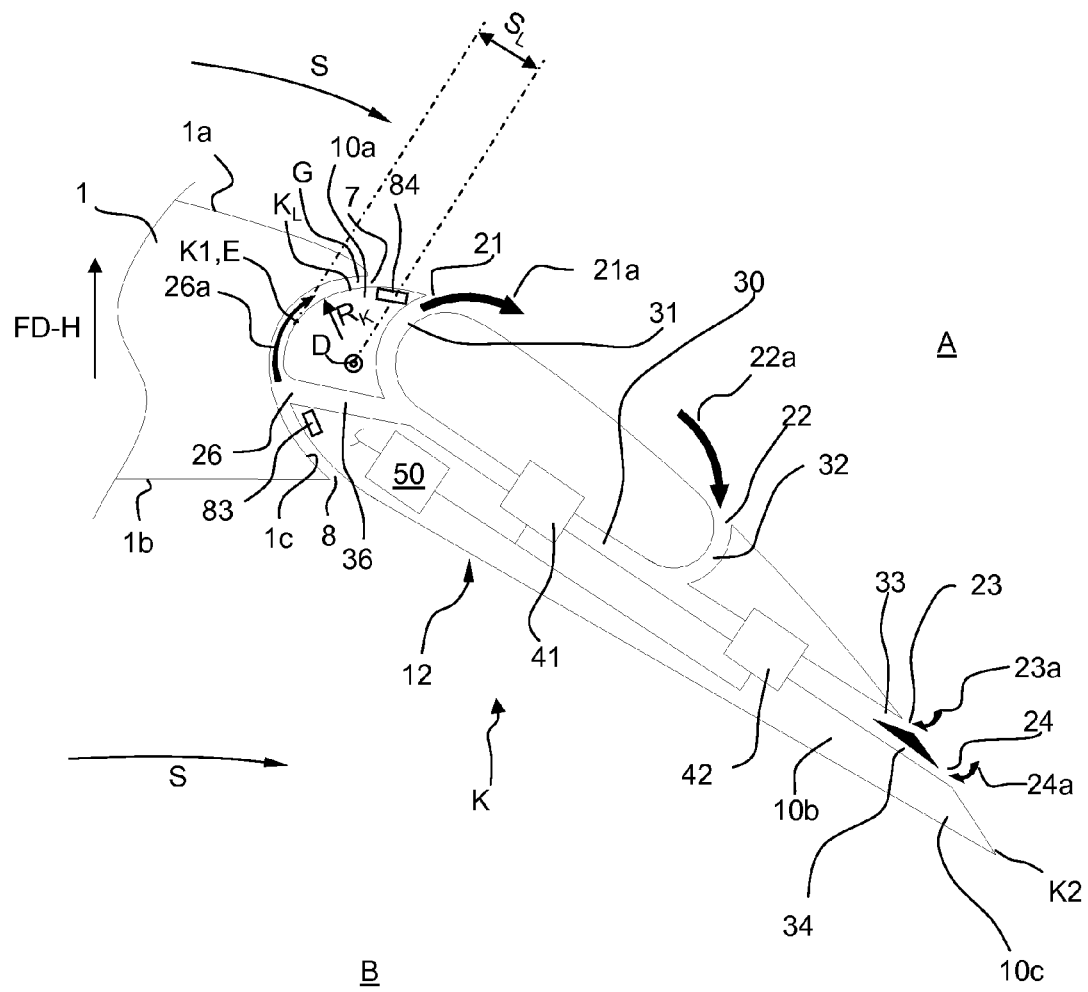
FIG. 3 shows the first embodiment of the aerodynamic body according to FIG. 1, in which two flow delivery driver devices are integrated into the air conduits in contrast to the illustration in FIG. 1.

In an exemplary embodiment of the inventive aerodynamic body that is illustrated in FIG. 3, the aerodynamic body is designed such that an outlet opening 26 discharges in the area B1 of the surface of the front region 10a of the high-lift flap K which is defined in that the curvature radius $R_K$ of the contour line $K_L$ of the front region 10a of the high-lift flap K has a value of 3% to 12% of the profile chord of the flap in the cross section of the high-lift flap K resulting transverse to the wingspan direction SW-K. The cross section extending transverse to the wingspan direction and, in particular, perpendicular to the wingspan direction may generally be used. Alternatively, it would also be possible to use the relevant cross section extending in the longitudinal direction of the aircraft, on which the wing with the inventive high-lift flap K is arranged or for which the wing is provided. In addition, the cross section, in which the respective outlet opening 26 and the at least one outlet opening 22, 23, 24 are situated, may also be decisive. It would furthermore be possible to use the cross section that extends perpendicular to the wingspan direction SW-K of the aerodynamic body or the adjustable flap and in which the flap chord direction KT-K is contained as illustrated in the figures. In this exemplary embodiment, the respective cross section or the high-lift flap K may contain only this one outlet opening 26 or also one or more additional outlet openings 21.

According to the invention, the position of at least one outlet opening 26 may be alternatively or additionally defined by the angular position of the adjustable flap or the high-lift flap K in the embodiments of the adjustable flap. Accordingly, at least one outlet opening 26 is situated in an area B1 of the contour line $K_L$ of the front region 10a of the high-lift flap K which is situated underneath the upper trailing edge 3 of the main wing 1 referred to the wing thickness direction FD-H of the main wing 1 in a certain maximum position of the adjustable flap or the high-lift flap K, respectively. The maximum position of a high-lift flap may, in particular, lie in the range between 50 and 70 degrees. In this case, the area may extend, in particular, from the location of the nose of the flap up to 15% of the flap chord.

In the instances, in which the location of at least one outlet opening 26 is defined for a certain position such as the landing position, i.e., in the definition by means of the curvature radius $R_K$ of the contour line $K_L$ of the front region 10a of the adjustable flap or the high-lift flap K and in the definition by means of the position of the high-lift flap K, the front region 10a is defined, in particular, in that it extends from the foremost point referred to the flap chord KT-K which faces the flow toward the rear end of the flap up to a point situated at 15% of the flap chord KT-K.

Figure 2:
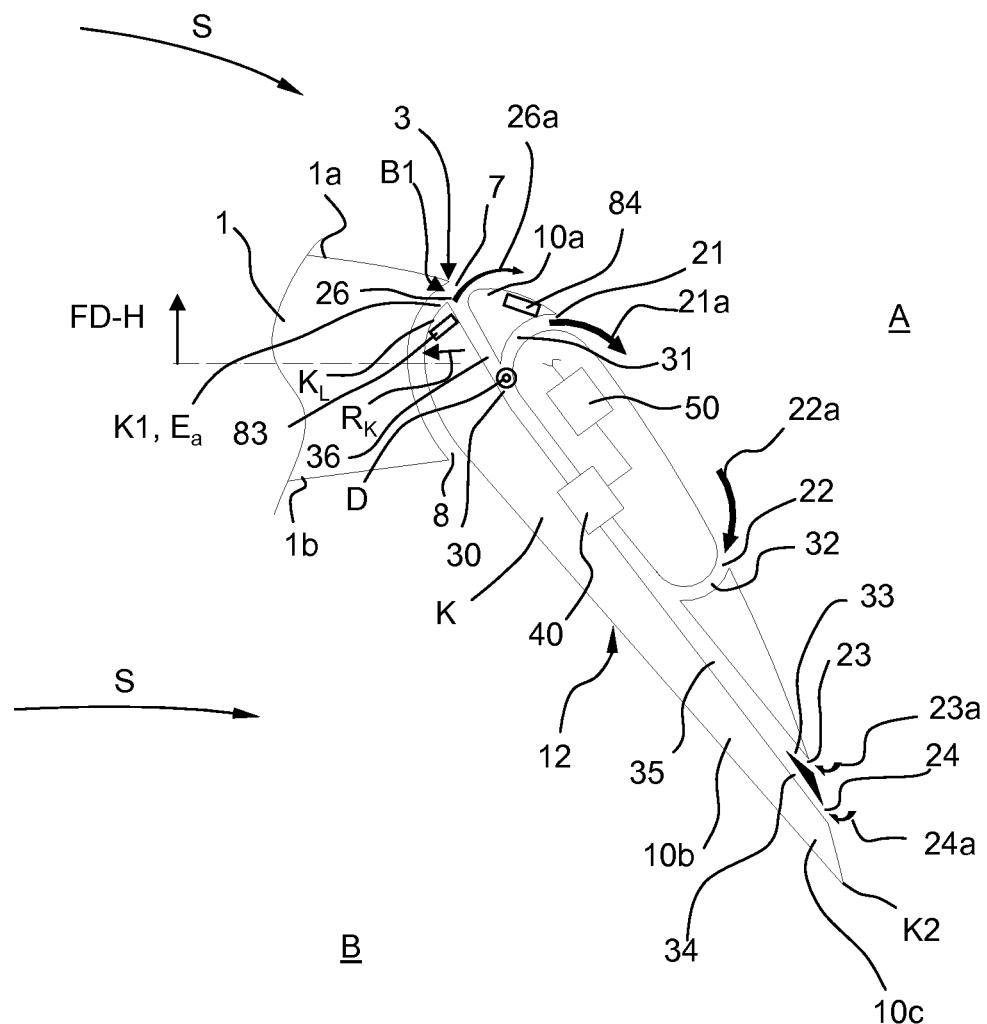
FIG. 2 shows the first embodiment of an aerodynamic body according to FIG. 1 in a far or completely extended position that may represent a landing position.

In the exemplary embodiment of the high-lift flap cross section illustrated in FIG. 2, in which the high-lift flap is illustrated in its fully extended position, the definition by means of the curvature radius $R_K$ of the counter line $K_L$, as well as the definition by means of the position of the high-lift flap K, is fulfilled in a certain maximum position of the flap. However, this does not necessarily have to be the case such that both ways of defining the location for the position of an outlet opening respectively are independent ways and, according to the invention, considered to be two alternatives for determining the position of at least one outlet opening.

In these alternatives, in particular, only this one outlet opening 26 may be provided in the front region of the high-lift flap K.

Since the at least one outlet opening 21, 26 and the at least one flow delivery driver device are provided, a continuous discharge (arrows 21a and 26a) of additional fluid into the boundary layer flow in the leading edge region of the flap K is effectively and efficiently realized in order to enhance the flow with a motion impulse such that it is able to withstand the pressure increase in the flow direction caused by the particularly curved contour of the flap K on the upper surface 11 in order to thusly maintain the boundary layer flow on the upper surface 11 on the upper side of the flap. The intake of air flowing around the high-lift flap K into the respective air intake openings 22, 23 and 24 is schematically indicated with respective arrows 22a, 23a and 24a.

The course of the contour line $K_L$ of the front region 10a K of the cross-sectional contour of the aerodynamic body or the high-lift flap K or the course of the upper surface 11 of the aerodynamic body or the high-lift flap K in the chord direction or the flap chord direction KT-K may be realized such that the curvature radius $R_K$ of the contour line $K_L$ of the front region 10a of the aerodynamic body or the high-lift flap K continuously changes from a curvature radius amounting to 3% of the profile chord of the aerodynamic body or the high-lift flap K to a curvature radius amounting to preferably 12% of the profile chord of the aerodynamic body or the high-lift flap K along the upper surface 11 in the flow direction S or in the chord direction or flap chord direction KT-K. According to an exemplary embodiment of the invention, all outlet openings 21, 26 of the aerodynamic body or the high-lift flap K are situated in this area of the contour line $K_L$. This stipulation may apply to individual or all exemplary embodiments of the invention.

The air outlet openings may be arranged adjacent to one another in the wingspan direction SW-K and, in particular, in the region extending up to 15% of the flap chord KT. Several air intake openings may be alternatively or additionally arranged adjacent to one another in the wingspan direction of the aerodynamic body or the flap SW-K and, in particular, in the region extending between 30% and 90% of the flap chord KT. Other air intake openings may be arranged alternatively or additionally to these intake openings on the upper surface and/or on the lower surface of the aerodynamic body or the flap in the trailing edge region, namely in the region from 90% to 100% of the flap chord. The aerodynamic effects attainable with the invention can be distributed or realized over the wingspan direction SW-K in a predetermined fashion in accordance with the arrangement of a plurality of openings in the wingspan direction. Mutually different configurations of at least one intake opening and at least one outlet opening may be successively arranged, in particular, in the wingspan direction of the aerodynamic body or the adjustable flap K. In this case, inventive configurations of at least one intake opening and at least one outlet opening may only be realized in some instances.

FIGS. 1 to 7 show that the intake openings 22, 23, 24 or the at least one intake opening are/is connected to the at least one outlet opening 21, 26 via air guide channels. FIGS. 1 to 7 show exemplary embodiments of the high-lift flap K, in which the intake openings 22, 23, 24 respectively the ends or exits of air guide channels or the respective channels 32, 33 and 34 and these air guide channels or channels lead into a junction channel 30 that, in turn, leads into the channels 31, 36 that respectively end in outlet openings 21 or 26 on the upper surface 11 of the high-lift flap K. According to another exemplary embodiment, at least one intake opening is connected to at least one outlet opening and at least one additional intake opening is connected to at least one additional outlet opening. The air flow on different intake openings and on at least one outlet opening 21, 26 is influenced in an active fashion by the power of at least one flow delivery driver device 40 that is activated by an activation device 50. The activation device 50 is functionally connected to the at least one flow delivery driver device 40 via a signal or data line 51, wherein the activation device 50 may be installed within the high-lift flap K or within the main wing 1. The activation device 50 may also be installed in the fuselage of the aircraft or functionally integrated into a central computer such as, e.g., the flight control.

According to the invention, an arrangement of a adjustable flap K such as a high-lift flap or a rudder with a device for influencing the flow thereon is therefore also proposed. The adjustable flap K is realized with a flow delivery driver device 40, 41, 42 according to one of the inventive embodiments. The device for influencing the flow features:

an activation device 50 that is functionally connected to the adjustable flap adjusting device and serves for controlling the flow delivery driver device 40, 41, 42, wherein the activation device 50 receives an input quantity in the form of the state of adjustment of the adjustable flap K from the adjustable flap adjusting device and has an activation function that is functionally connected to the flow delivery driver device 40, 41, 42 and serves for generating a command signal for controlling the throughput of the flow delivery driver device 40, 41, 42, wherein said activation function generates a corresponding control signal for the activation of the flow delivery driver device 40, 41, 42 from the state of adjustment of the adjustable flap K.

In the exemplary embodiments of such an arrangement of a adjustable flap K or high-lift flap 10 with a device for influencing the flow according to FIGS. 1 to 4, the device for influencing the flow features a flow delivery driver device or a pump 40, the intake line 40*a* of which is connected to at least one intake opening 22, 23, 24 on the adjustable flap K or the high-lift flap 10 and the delivery line 40*b* of which is connected to at least one outlet opening 21 on the high-lift flap 10. In the exemplary embodiment shown, three intake openings 22, 23, 24 are connected to the intake line 40*a* of the pump 40 and one outlet opening 21 (FIGS. 2 and 4) or two outlet openings 21, 26 (FIGS. 1 and 3) are connected to the delivery line 40*b* of the pump 40. In addition, an activation device 50 that is functionally connected to the (not-shown) high-lift flap adjusting device and serves for controlling the pump delivery pressure and/or the pump intake pressure and/or the differential pump pressure is provided as device for influencing the flow. The activation device 50 features a receiver, by means of which the input quantity in the form of the state of adjustment of the adjustable flap K or of the high-lift flap 10 can be received from the high-lift flap adjusting device. The activation device 50 furthermore has an activation function that is functionally connected to the pump 40 and serves for generating a control or command signal for controlling the pump delivery pressure and/or the pump intake pressure and/or the differential pump pressure. The activation function generates or determines the control or command signal based on the input quantity or the state of adjustment of the high-lift flap 10 received from the high-lift flap adjusting device. The activation device 50 sends the control or command signal to the pump or a control element of the pump 40 that is realized in such a way that it subsequently adjusts the corresponding pump delivery pressure and/or pump intake pressure and/or differential pump pressure and thusly adjusts the flow around the high-lift flap in a predetermined fashion depending on its state of adjustment.

In this case, several pumps 41, 42 may also be provided or installed in the air guide channels as shown in FIG. 3. In the exemplary embodiment illustrated in FIG. 3, two pumps that are both activated by the activation device 50 are installed in the central junction channel 30.

Figure 4:
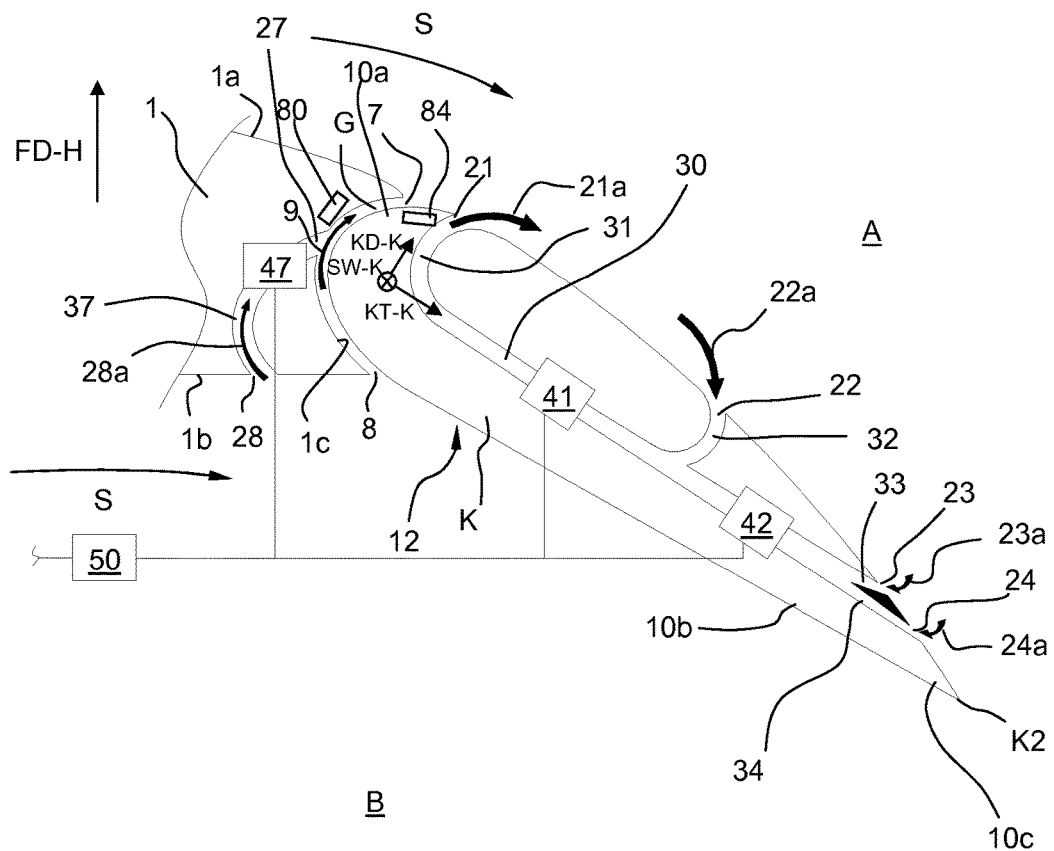
FIG. 4 shows a schematic representation of an exemplary embodiment of an arrangement of a wing or a adjustable flap and, in particular, a high-lift flap with a device for influencing the flow thereon, wherein the adjustable flap features an outlet opening, several intake openings and air conduits that connect these openings, as well as a flow delivery driver device for influencing the flow within the air conduits, and wherein the main wing features an intake opening on its lower surface or pressure side and an outlet opening in the region between the main wing and the high-lift flap, a channel connecting the openings and a flow delivery driver device for influencing the flow within this channel.
Figure 5:
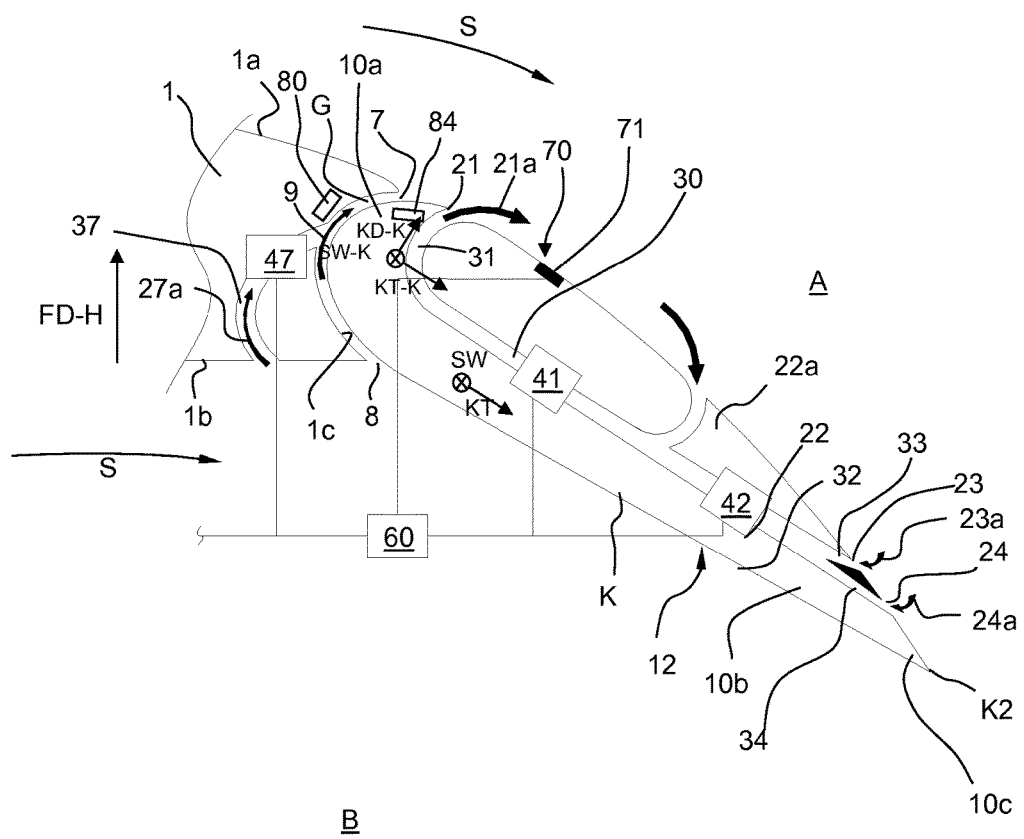
FIG. 5 shows a schematic representation of another inventive embodiment of an arrangement of a wing or a adjustable flap such as a high-lift flap with a device for influencing the flow thereon according to FIG. 4, wherein the power of the flow delivery driver devices is, in contrast to FIG. 4, regulated by means of a control device based on the sensor values of a sensor device.

According to another exemplary embodiment of the invention that is illustrated in FIGS. 4 and 5, the adjustable flap K or the high-lift flap and/or the arrangement of a adjustable flap K or high-lift flap 10 with a device for influencing the flow thereon is/are realized in accordance with an inventive exemplary embodiment and a channel 37 that extends from the lower surface 1*b* to the rear surface 1*c* of the main wing 1 is additionally provided in the main wing 1. Consequently, a flow that is indicated with the arrow 28 in FIG. 5 and can intensify the flow (arrow 9) in the gap G which is directed from the second end 8 toward the first end 9 results in the channel 37. In this case, the outlet opening may be arranged in the front region 10*a* of the high-lift flap 10 at a location proposed in accordance with the invention.

In one exemplary embodiment, no device for influencing the flow is provided, i.e., no pump is provided for influencing the pressure in the high-lift flap channels or in the main wing channel 37, and no pump is provided in the channel 37 or no opening or closing devices are provided on air inlets such that the air flow in the channel 37, as well as in the channels of the high-lift flap K, is formed in a passive fashion.

According to another exemplary embodiment, a pump 47 that is activated by an activation device 50 is installed in the additional channel 37 arranged in the main wing 1 and makes it possible to influence the flow in the channel 37 and therefore the flow between the intake opening 28 and the outlet opening 27 that discharges on the gap G between the main wing 1 and the high-lift flap 10. The pump 47 can intensify or weaken the flow (arrow 9) in the gap G which is directed from the second end 8 toward the first end 9 and created when the flow S flows around the main wing 1 and the high-lift flap in accordance with the respective activation by the activation device 50. In addition, pumps that are activated by an activation device 50 and serve for influencing the air flow in the air guide channels of the high-lift flap 10 may also be provided. In this case, the activation device 50 may consist of the activation device, by means of which the pumps for influencing the air flow in air guide channels of the high-lift flap 10 are also activated. According to the invention, the activation device 50 may, in particular, receive its inputs from a flap adjusting device or, in particular, a high-lift flap adjusting device.

According to another exemplary embodiment of the invention, an arrangement of a adjustable flap K with a device for influencing the flow thereon is proposed, wherein this arrangement features alternatively or additionally to a flow delivery driver device:

one respective device 80 for varying an opening on at least one outlet opening on the adjustable flap K and/or on at least one intake opening of the adjustable flap K in order to open and close the at least one outlet opening and/or the at least one intake opening by means of a mechanism 83 for varying an opening and an actuator 81 that serves for actuating the respective mechanism 83 for varying an opening and is coupled thereto, wherein the activation device 50 for controlling the actuator 81 of the respective device 80 for varying an opening is functionally connected to the flap adjusting device and receives an input quantity in the form of the state of adjustment of the adjustable flap K from this flap adjusting device, wherein the activation device 50 has an activation function that is functionally connected to the respective actuator 81 and serves for generating a command signal for controlling the actuator 81, and wherein said activation function generates a corresponding signal for opening and closing the at least one outlet opening and/or the at least one outlet opening from the state of adjustment of the adjustable flap K and transmits this signal to the actuator 81.

The flap adjusting device may generally consist of a control device of the aircraft system. The flap adjusting device may also consist of a control element or a sensor device that is locally arranged on the flap adjusting mechanism and acquires or forwards the respective state of adjustment of the adjustable flap, e.g., to the activation device or and optionally provided control device 60. Furthermore, states of flow in a channel or several channels in the high-lift flap and/or in the main wing may be acquired by means of a suitable sensor and forwarded to the high-lift flap adjusting device in the form of flow values in order to control the state of flow and to vary the activation or regulation of devices for influencing the flow.

Figure 6:
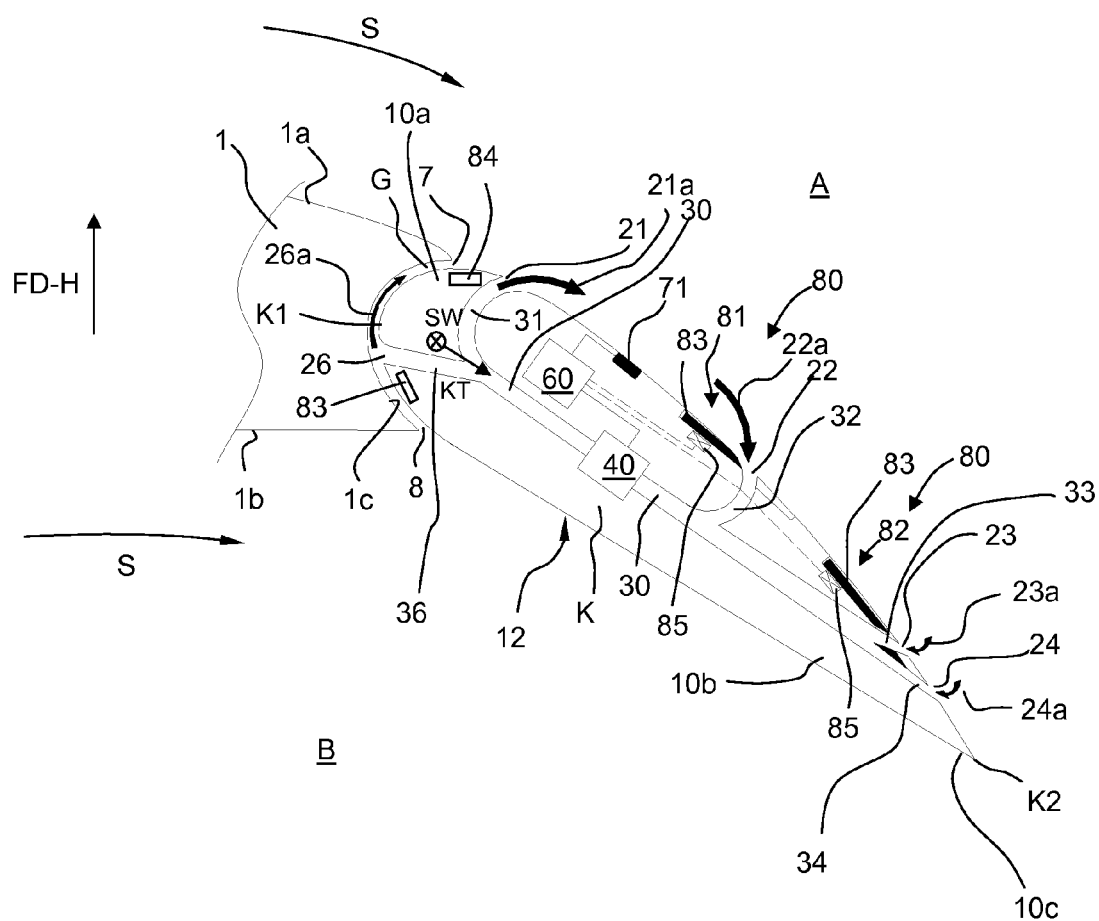
FIG. 6 shows a schematic representation of another inventive embodiment of an arrangement of a wing with a adjustable flap such as a high-lift flap with a device for influencing the flow thereon, wherein the air flow is formed in an active fashion due to two outlet openings in the front region of the adjustable flap and several intake openings, as well as channels connecting these openings, namely by means of a regulated pump and regulated opening and closing devices on the outlet openings and on the intake openings.
Figure 7:
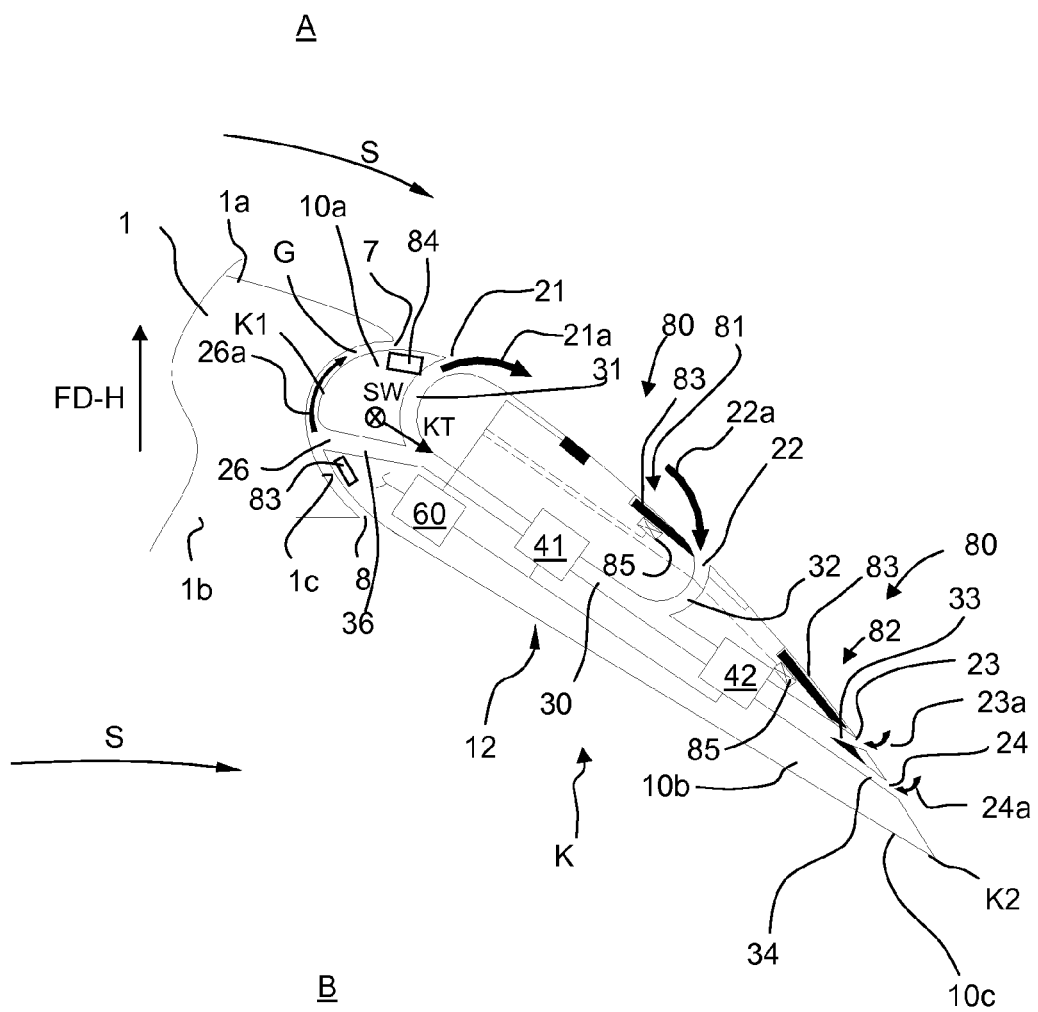
FIG. 7 shows a schematic representation of another inventive embodiment of an arrangement of a wing or a adjustable flap with a device for influencing the flow thereon, wherein the air flow on different outlet openings and on several intake openings, as well as in the channels connecting these openings, is formed in an active fashion by means of several regulated pumps and regulated opening and closing devices on the outlet openings and on the outlet openings.

The invention alternatively or additionally proposes that the pump delivery pressure and/or the pump intake pressure and/or the differential pump pressure of the respective pump arranged in the main wing 1 and/or in the adjustable flap K or the high-lift flap 10 is adjusted by a control device 60 as shown in FIGS. 5 to 7. In this case, the device for influencing the flow also features a sensor device 70 with a sensor 71 that is arranged on the upper surface 11 of the adjustable flap K or the high-lift flap 10 and serves for acquiring current flow values on the upper surface 11 of the adjustable flap K or the high-lift flap 10, wherein the sensor device is functionally connected to the control device 60 in such a way that the latter can receive input signals in the form of these sensor signals. The control device 60 furthermore has a regulating function for regulating a predetermined flow value on the upper surface 11 of the adjustable flap K or the high-lift flap 10. The regulating function is functionally connected to the sensor device 70 in order to receive current flow values and to the flap adjusting device in order to receive a value for the state of adjustment of the adjustable flap K or the high-lift flap 10. The regulating function furthermore is functionally connected to at least one pump and generates a control signal that is transmitted to the at least one pump by the regulating function in order to adjust the pump delivery pressure and/or the pump intake pressure and/or the differential pump pressure and to thusly influence the flow on the respectively assigned channel outlets and therefore on the suction side A of the high-lift flap 10.

According to the invention, an arrangement of a adjustable flap K with a device for influencing the flow thereon is also proposed, wherein the device for influencing the flow features:

one respective device 80 for varying an opening on at least one outlet opening on the adjustable flap K and/or on at least one intake opening of the adjustable flap in order to open and close the at least one outlet opening and/or the at least one intake opening by means of a mechanism 83 for varying an opening and an actuator 81 that serves for actuating the respective mechanism 83 for varying an opening and is coupled thereto, a sensor device 70 with at least one sensor 71 that is arranged on the upper surface 11 of the adjustable flap K and serves for acquiring current flow values on the upper surface 11 of the adjustable flap K;

a control device 60 with a regulating function that serves for regulating a predetermined flow value of the adjustable flap K and is functionally connected to: the sensor device 70 in order to receive current flow values from the sensor device 70, the adjustable flap adjusting device in order to receive a value for the state of adjustment of the adjustable flap K from the adjustable flap adjusting device and the at least one actuator 81 in order to generate a command signal by means of the control device and to transmit the command signal to the actuator 81 so as to adjust the opening and closing position of the respective device 80 for varying an opening.

In this exemplary embodiment, the control device 60 may be connected to a flow delivery driver device that is integrated into a conduit provided in the adjustable flap.

In the inventive embodiments with a regulating function, the sensor device 70 may feature a sensor 71 for acquiring the state of the flow on or separated from the upper surface 11 of the adjustable flap. A sensor 71 for acquiring the flow speed may be alternatively or additionally provided and/or the sensor 71 may consist of a piezoelectric wall shear stress sensor for acquiring the wall shear stress.

The control device may be functionally connected to one or more pumps that are arranged in the channels of the adjustable flap K or the high-lift flap K and/or the at least one channel 37 in the main wing 1. In the exemplary embodiment illustrated in FIG. 5, the state of flow is regulated by means of two pumps 41, 42 that are installed in the adjustable flap K or the high-lift flap and a pump 47 integrated into the channel 37 in the main wing 1. In one variation, the main wing 1 does not feature a channel 37. A channel 37, in which the flow is not influenced by a pump 47, may also be provided in the main wing. In this case, an arrangement of a main wing and an arrangement of a adjustable flap K with a device for influencing the flow thereon according to an inventive embodiment is therefore proposed, wherein the main wing 1 features a channel 37 that extends from an intake opening 28 arranged on the pressure side 1b of the main wing 1 to an air outlet opening 27 arranged on the rear surface 1c of the main wing 1 which faces the adjustable flap K such that the air flow 28 occurring between the outlet opening 28 and the air outlet opening 27 influences the flow in the gap G between the main wing 1 and the adjustable flap K.

The inventive device for influencing the flow therefore may feature a device 80 for varying an outlet opening that is provided on at least one intake opening 22, 23, 24 on the high-lift flap 10 and/or on at least one outlet opening 21 of the high-lift flap 10 in order to open and close and/or to enlarge or reduce the at least one intake opening and/or the at least one outlet opening. For this purpose, the device 80 for varying an outlet opening features and is connected to an actuator 85 that serves for actuating the respective device 80 for varying an outlet opening. The device 80 for varying an outlet opening may consist, e.g., of a slide 83. The actuator 85 for actuating the respective device 80, 81, 82 for varying an outlet opening may consist, in particular, of a piezoelectric actuator. In FIG. 7, one respective device 80 for varying an outlet opening, i.e., a first device 81 for varying an outlet opening and a second device 82 for varying an outlet opening, is arranged on the opening 22 and on the openings 23, 24 together with an actuator 85 that serves for their actuation, wherein the device 81, 82 for varying an outlet opening is realized on the openings 23, 24 in such a way that it can open or close these two openings 23, 24 in different opening positions. In this way, the control device 60 can realize the intake of air through the at least one intake opening 22, 23, 24 and/or the discharge of air through the at least one outlet opening 21 in accordance with predetermined specifications or regulating objectives. The flow around the high-lift flap can thusly be regulated independently of the state of adjustment of the high-lift flap and stabilized in a predetermined fashion. According to the invention, a device for varying an outlet opening that is activated by an activation device 50 or a control device may also be arranged on all intake and/or all outlet openings of the adjustable flap or the main wing. In addition, an air guide channel 37 may be arranged in the main wing 1 as shown in FIG. 4. In this case, a device 80 for varying an outlet opening which is also activated by a control device may also be provided on the outlet 27.

In these embodiments, the state of adjustment of the high-lift flap 10 may also be transmitted to the control device 60 by an adjusting device—if a corresponding functional coupling between the control device 60 and the flap adjusting device is realized—such that the control device can also take into consideration the state of adjustment of the high-lift flap 10 in the determination of the activation quantities for the respective device for varying an outlet opening.

In this context, opening or closing an opening generally does not mean the complete opening or closing of the opening only, but also the partial opening and closing of the opening.

FIG. 6 shows an exemplary embodiment of an inventive arrangement of a high-lift flap 10 with a device for influencing the flow thereon, in which the control device 60 regulates the flow around the flap with a pump 40 and with a device 80 for varying an outlet opening—in the respectively described fashion. According to the invention, this embodiment may also be combined with all variations of channels, intake openings and outlet openings on the main wing 1 and/or on the high-lift flap 10. FIG. 7 shows such an arrangement, in which two pumps 41, 42 are installed in or on channel sections of the high-lift flap 10, wherein the pumps 41, 42 are arranged in the central channel 30.

FIG. 6 shows a schematic representation of another inventive embodiment of an arrangement of a wing with a adjustable flap such as a high-lift flap that features a device for influencing the flow thereon, wherein the air flow on different intake openings and on two outlet openings is formed in an active fashion in the region between the main wing and the high-lift flap, as well as in channels connecting the main wing and the high-lift flap, by means of a regulated pump and regulated opening and closing devices on the outlet openings and on the inlet openings. In a certain flap position that may, in particular, be the landing position, one or both of the front air outlet openings 21, 26 are open and regulated while the rear outlet opening is closed. The outlet openings may be controlled or regulated with respect to the degree, to which they are opened, depending on, in particular, the respective state of adjustment of the adjustable flap by actuating the corresponding device for varying an opening. For another state of adjustment of the flap, particularly for the take-off position, the front air outlet opening of the two air outlet openings may, for example, be closed and the rear outlet opening may be open, wherein the degree, to which the rear outlet opening is opened, is regulated by means of a control device in accordance with a described embodiment. In this case, the degree, to which one or more intake openings are opened, can be controlled by a control device 50 or also regulated by a control device 60, namely by actuating the corresponding device for varying an opening.

According to the invention, an aircraft with an aerodynamic body and a adjustable flap that can be moved thereon and features a control device with a flap activation function for adjusting the adjustable flaps in accordance with an embodiment of the invention is therefore proposed. In this case,

- a flow delivery driver device 40, 41, 42 may be integrated into the air conduit 30, 31, 32, 33, 34, 35, 36 in order to influence the flow within the air conduit 30, 31, 32, 33, 34, 35, 36, and
- the control device may generate activation commands for adjusting a state of adjustment of the adjustable flaps K and activation commands for the flow delivery driver device 40, 41, 42 that serve for adjusting the throughput of the flow delivery driver device 40, 41, 42 based on control commands and transmits said activation commands to the adjustable flaps and to the flow delivery driver device.

The adjustable flap K may feature, in particular, a first front air outlet opening 26 and at least one second rear air outlet opening 21, wherein the second rear air outlet opening 21 is situated behind the first front air outlet opening (26) referred to the flow direction S and in the front region 10a of the adjustable flap K which extends from 3% to 15% of the flap chord KT. Furthermore, a device 80 for varying an opening may be arranged on the first outlet opening 26 and on at least one second outlet openings 21 of the adjustable flap K in order to open and close the respective outlet opening. The activation device 50 may be functionally connected to the devices 80 for varying an opening in order to control the respective device 80 for varying an opening and receive an input quantity in the form of the state of adjustment of the adjustable flap K therefrom. An activation function that is functionally connected to the respective actuator 81 may feature for generating a command signal for controlling the actuator 81 which generates a corresponding signal for opening and closing the at least one outlet opening and/or the at least one outlet opening from the state of adjustment of the adjustable flap K and transmits this signal to the actuator 81.

In this case, the control device 50 may have a function for adjusting a state of adjustment of the adjustable flaps K based on control commands while commanding states of adjustment of adjustable flaps K, the throughput of the flow delivery driver device 40, 41, 42 and the state of the devices 80 for varying an opening which are assigned to the air outlet openings 21, 26, wherein

- the first front air outlet opening 26 is in a closed state due to the activation of the device 80 for varying an opening assigned thereto while commanding a first range of adjustment of adjustable flaps K and
- the first front air outlet opening 26 is in an open state due to the activation of the device 80 for varying an opening assigned thereto while commanding a second range of adjustment of adjustable flaps K.

The function for adjusting the state of the devices 80 for varying an opening which are assigned to the air outlet openings 21, 26 may be realized in such a way that the first front air outlet opening 26 is in an open state due to the activation of the device 80 for varying an opening assigned thereto while commanding a second range of adjustment of adjustable flaps K and the second air outlet opening 21 is simultaneously in a closed state at least in certain time segments due to the activation of the device 80 for varying an opening assigned thereto. In this case, the adjustable flap K also may, in particular, be extended farther in the second range of adjustment than in the first range of adjustment of the adjustable flap K.

The following openings may be provided on the surfaces of the adjustable flap K, i.e., on its upper surface and/or lower surface, in the flap chord direction KT:

- at least one air outlet opening that is arranged in the front region 10a of the adjustable flap K referred to the flow direction which extends up to 15% of the flap chord, and
- at least one air intake opening 23, 24, 25 that is arranged on the upper surface of the adjustable flap and in the rear region 10b of the adjustable flap K referred to the flow direction which extends between 30% and 90% of the flap chord KT and/or on the upper surface of the adjustable flap in the trailing edge region 10c extending from 90% to 100% of the flap chord and/or on the lower surface of the adjustable flap in the trailing edge region 10c of the adjustable flap K which extends from 90% to 100% of the flap chord KT.

The control device with a flap activation function for adjusting the adjustable flaps K may feature an activation device 50 for controlling the flow delivery driver device 40, 41, 42. The control device with a flap activation function for adjusting the adjustable flaps K may alternatively feature a control device 60 for controlling the flow delivery driver device 40, 41, 42.

In the inventive embodiments, the gap G formed between the main wing 1 and the adjustable flap K may be realized in such a way that it is not aerodynamically active, i.e., that the adjustable flap consists of a so-called "gapless flap." In these embodiments, no channel 37 leading into the gap G is provided in the main wing.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A wing of an aircraft, the wing comprising:
a main wing; and
an adjustable flap disposed thereon, wherein the adjustable flap extends along a flap chord direction, the adjustable flap comprising:
   an upper surface extending along a suction side created by a flow along the adjustable flap;
   a lower surface extending along a pressure side created by the flow along the adjustable flap;
   at least one air conduit;
   a flow delivery driver device integrated in the at least one air conduit for influencing flow within the air conduit;
   at least one air outlet opening operated by the flow delivery driver device, the air outlet opening being arranged, with reference to the flap chord direction, in a front region of the adjustable flap and comprising a front outlet opening and at least one rear air outlet opening connected to the at least one air conduit,
      wherein the rear air outlet opening is disposed behind the front outlet opening, with reference to the flap chord direction, and in the front region of the adjustable flap, which extends from 3% to 15% of a flap chord, and
      wherein the front outlet opening is disposed in the front region of the adjustable flap, which extends from 0% to 3% of the flap chord, and on a foremost end of, or the upper surface or the lower surface of, the adjustable flap; and
   at least one air intake opening operated by the flow delivery driver device, the air intake opening being arranged on the upper surface of the adjustable flap and in a rear region of the adjustable flap with reference to the flap chord direction, wherein the rear region extends between 30% and 90% of the flap chord,
wherein a gap is disposed between the main wing and the adjustable flap, the gap having, with respect to a thickness direction of the main wing, an upper end and a lower end, between which a channel extends, such that the main wing and the adjustable flap, with respect to the thickness direction of the main wing, overlap in all adjustable positions of the adjustable flap,
wherein the front outlet opening is disposed in the front region of the adjustable flap such that, in a position of the adjustable flap of 60 degrees plus or minus eight (8) degrees or in a fully extended position of the adjustable flap, the front outlet opening is situated underneath a trailing upper edge of the main wing, with respect to the thickness direction of the main wing,
wherein the front outlet opening extends in the flap chord direction from a location situated exactly underneath the trailing upper edge of the main wing toward a leading edge of the adjustable flap by 3% of the flap chord and toward a trailing edge of the adjustable flap by 3% of the flap chord,
wherein the front outlet opening opens into the gap,
wherein an activation device is configured to control the flow delivery driver device,
wherein the activation device has an activation function that is configured to generate a command signal for controlling the flow delivery driver device,
wherein the activation function is configured to generate the command signal for controlling the flow delivery driver device depending on an adjustment state of the adjustable flap,
wherein a contour line of the front region of the adjustable flap along the upper surface continuously changes from a curvature radius amounting to 3% of a profile chord of the adjustable flap to a curvature radius amounting to 12% of the profile chord of the adjustable flap in the flap chord direction, and
wherein the profile chord is respectively determined at a location where at least one of the front outlet and the rear air outlet openings is disposed.

* * * * *